Sept. 21, 1954   L. G. BRIGGS   2,689,877
FLAT DRY CELL
Filed April 19, 1951   2 Sheets-Sheet 1
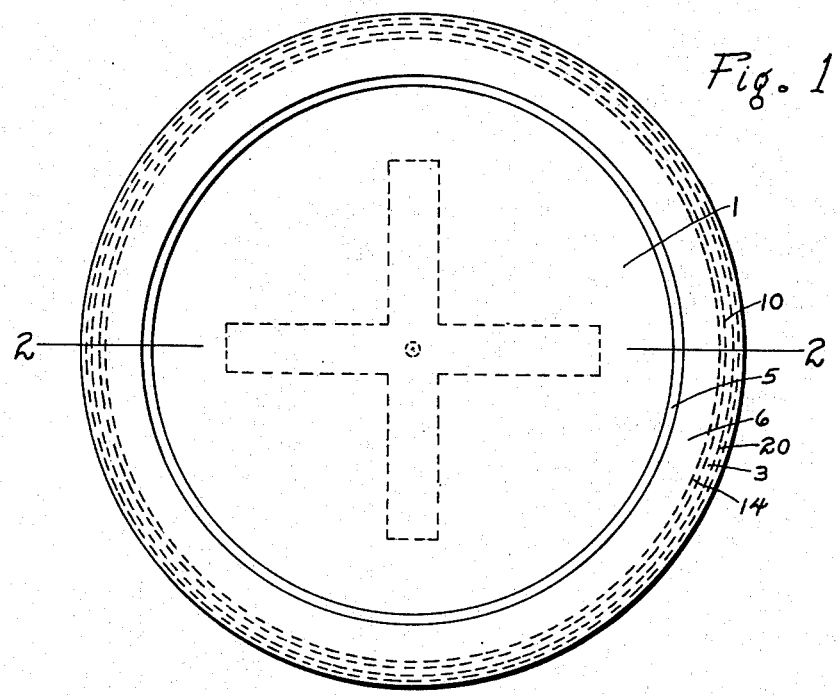
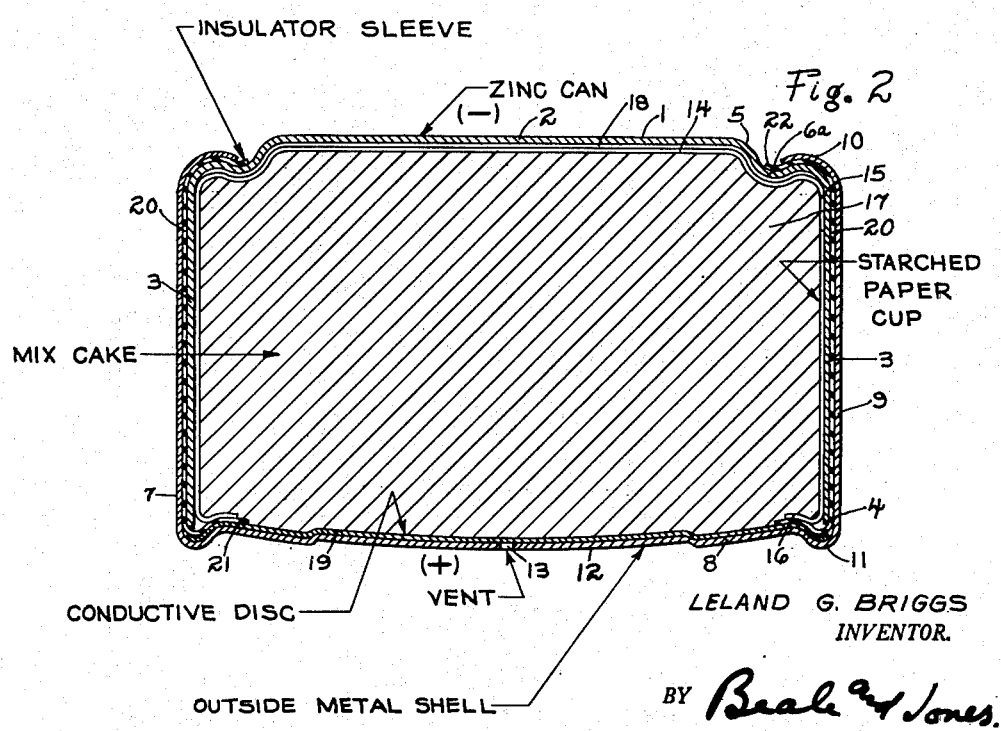
LELAND G. BRIGGS
INVENTOR.
BY Beale & Jones
Attorneys Sept. 21, 1954   L. G. BRIGGS   2,689,877
FLAT DRY CELL
Filed April 19, 1951   2 Sheets-Sheet 2
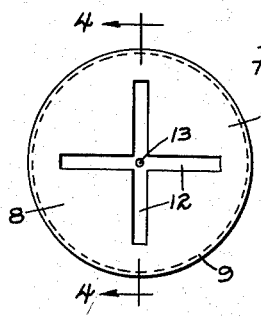
Fig. 3
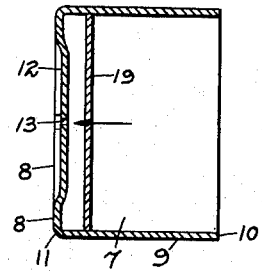
Fig. 4
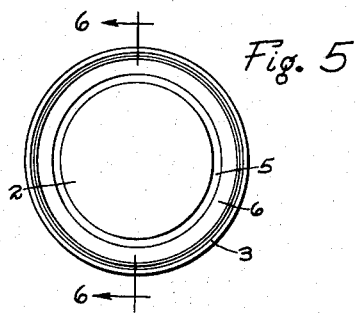
Fig. 5
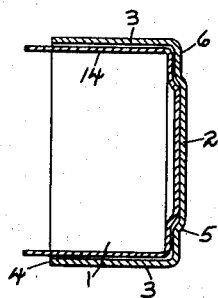
Fig. 6
Fig. 8
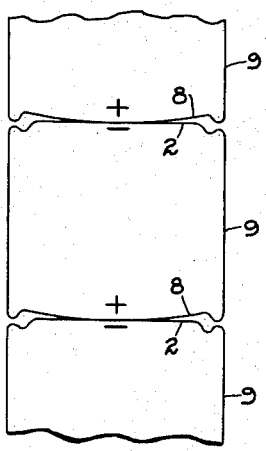
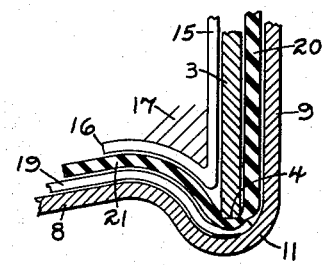
Fig. 7
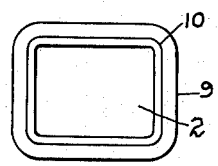
Fig. 9
LELAND G. BRIGGS
INVENTOR.
BY Beale and Jones.
Attorneys Patented Sept. 21, 1954

2,689,877

UNITED STATES PATENT OFFICE 2,689,877

FLAT DRY CELL

Leland G. Briggs, Blooming Grove, Wis., assignor to Ray-O-Vac Company, Madison, Wis., a corporation of Wisconsin Application April 19, 1951, Serial No. 221,844

5 Claims. (Cl. 136—111)

This invention relates to a dry cell of the Leclanché type and more particularly to a flat cell capable of being used as a cell unit, or of being stacked to form batteries, of minimum size and desired voltage or amperage.

There exist on the market today a number of types of dry cells of the Leclanché type utilizing a conventional central carbon pole, and a concentrically disposed zinc cup which accommodates not only the carbon pole but also the electrolyte and depolarizer mass. Various methods have been resorted to in these prior art cells with a view toward attempting to seal, within the cell, the fluid and essentially corrosive cell reactants, particularly the electrolyte and decomposition products formed thereby. Certain prior art workers have largely solved the problem of restraining and minimizing electrolyte leakage in Leclanché type cells which utilize the central carbon pole. However, this type of cell construction while admirable for many purposes, such as flashlight batteries, does not lend itself readily to the construction of small flat dry cells which are exceedingly useful where considerations of space are important.

This invention has for an object the provision of a flat dry cell of the Leclanché type which may be manufactured in a variety of sizes and shapes, including extremely small sizes, and wherein the conventional central carbon pole is entirely dispensed with. A further object of the invention is the provision of a dry cell which lends itself readily to mass production largely by machine methods and which nevertheless is characterized by a highly efficient seal. A further object is the provision of a dry cell so constructed that leakage of electrolyte is greatly restrained and minimized. A still further object is the provision of dry cell construction which permits the venting of excess gas generated during discharge, without permitting electrolyte leakage from within the cell and thus minimizing distortion of the cell walls and the possible breaking of the effective seal. Another object of the invention is the provision of the cell so constructed as to facilitate the stacking of a plurality of cells, one upon another, so as to provide cell-to-cell contact as may be desired, thus making possible the fabrication of batteries which are characterized by relatively small sizes. Further objects will be apparent from the following description:

In the accompanying drawings:

Figure 1 is a top plan view of an illustrative cell when positioned so that the negative terminal is uppermost;

Figure 2 is a side elevation in a cross section of the cell shown in Figure 1 as taken along the lines 2—2 and shows the forms assumed by the pair of opposed metal cups in the final assembly of the cell;

Figure 3 is a bottom plan view of the metallic cup which forms the positive terminal of the cell illustrated in Figure 2 as shaped prior to assembly of the completed cell;

Figure 4 is a cross sectional side elevation of the metal cup shown in Figure 3 and as taken along the lines 4—4;

Figure 5 is a top plan view of the metal cup which forms the negative terminal of the cell as illustrated in Figure 2 as shaped prior to assembly of the completed cell;

Figure 6 is a side elevation in cross section of the cup shown in Figure 5 as taken along the line 6—6;

Figure 7 is a detail, somewhat enlarged and in cross section, illustrating the junction and seal at the lower peripheral edge of the cell illustrated in Figure 2;

Figure 8 is a somewhat diagrammatic side elevation showing the position assumed by a superimposed stack of the cells illustrated in Figure 2;

Figure 9 is a top plan view of an alternate form of cell, differing from the view illustrated in Figure 1 of the drawings in showing a cell of rectangular outline.

Referring to the drawings, and with more particularity to Figures 1 and 2 thereof, I represents generally a zinc can, or cup, which serves the dual function of providing the end closure for one end of the cell and the negative cell terminal thereof and may, in some instances, supply all of the zinc necessary for the desired cell reaction. Zinc can I has a generally flattened outer surface 2 which in the form illustrated in Figures 1 and 2 of the drawings is circular in outline and has a diameter somewhat less than the diameter of the zinc can itself. The outer margin of surface 2 terminates in a downwardly depending lip 5 which joins an annular peripheral rim 6 whereby the latter is somewhat depressed below the surface 2 of the can. An annular sidewall 3 depends from the annular rim 6 and terminates in a relatively flattened marginal edge 4.

At the opposite or positive end of the cell is disposed another metallic can or cup, generally referred to as 7, having a generally circular somewhat flattened bottom surface 8 which terminates in an annular sidewall 9 which in turn has an upper marginal lip 10. In the prefabrication of can 7 it is preferred to provide indented ribs 12 which preferably, although not necessarily, may be intersecting to from a cross (+). In this form the cross indicates, for identification, the positive terminal of the cell while at the same time the ribs provide stiffening for the bottom surface of can 7 and also increase contact with the cell elements within the cell as will be described. An aperture to provide a vent 13 is disposed on the bottom surface of can 7 and preferably within one of the ribs 12; in the view shown in Figures 2 and 3 of the drawings the vent 13 is centrally disposed.

As will be apparent from Figure 2 of the drawing, can 1 is adapted to fit snugly within can 7 with the sidewalls of the two cans in parallelism and overlapping. When the cans are so disposed, the interior space defined by the respective ends and sides of the two cans is adapted to accommodate the cell components. Within the zinc can 1 is placed a paper cup 14 preferably of cereal coated paper and proportioned for a snug fit adjacent the bottom 2 and sidewalls 3 of can 1. Paper cup 14 has sidewalls, the extremities of which, 16, are slightly longer than the sidewalls of the zinc can. Mix cake 17 is supplied to the interior of the paper cup 14 to fill the interior thereof with depolarizer mix to a point substantially equal to the heighth of the sidewalls 3 of the zinc can. Paper cup 14 is adapted to permit migration of the fluid electrolyte portion of the mix cake and thus insure conductive contact between the zinc can and the fluid components of the mix cake while preventing migration of the solid particles of the mix cake or solid decomposition products which might tend to form internal shorts.

A plastic conductive disc 19 overlies the inner surface of bottom 8 of metal can 7 and is adapted on its inner surface to be in direct contact with the mix cake. This plastic disc 19 preferably should be proportioned to cover completely the prefabricated bottom 8 of metal can 7 and should have a diameter substantially the same as the inner diameter of can 7. A plastic insulating sleeve in the form of a cylindrical tube 20 separates the otherwise adjacent sidewalls 3 and 9 of cans 1 and 7.

In assembling the cell it is preferred to commence with a prefabricated zinc cup shaped as illustrated in Figures 5 and 6 of the drawings. For the sake of illustration, paper cup 14 is shown as inserted in zinc cup 1, Figure 6 of the drawings. Where obtainable, zinc cups made of extruded cans having heavy or thick bottoms are preferred. Where such extruded cans cannot be obtained, drawn cans of suitable gauge are satisfactory. As a result of extensive field tests, it has been found that depending on the cell size zinc cans of 6 gauge zinc are operative but that there is some tendency for perforation and leakage to result on discharge of the cell where such thin gauge zinc is used in larger cells. This can be avoided by the providing an auxiliary disc or plate of zinc which may be inserted in the space indicated as 18 between the bottom of zinc can 1 and the bottom of the paper cup 14 on Figure 2 of the drawings. It is preferred to use somewhat heavier gauge zinc in larger cells and 9 gauge has been used with success with and without the provision of an auxiliary disc. When using 11 gauge zinc, it is generally not necessary to provide an auxiliary zinc disc, even in large cells.

In preassembly after the paper cup 14 has been inserted within the zinc can 1, the mix cake is added to the interior of the paper cup. The mix cake may be MnO2 which may be either natural or artificial and to which may be added finely divided carbonaceous material for the purpose of forming a satisfactory depolarizer mix. A desired quantity of electrolyte which may, for example, be a solution of ammonium chloride and zinc chloride is uniformly incorporated in the mix cake. Preferably the mix cake should not fill the paper cup but should substantially fill a portion of the paper cup equivalent to the interior of the zinc can. The plastic insulating sleeve 20 may then be placed around the sidewall 3 of the zinc can. The length of the tubing of which this plastic sleeve is formed should exceed the heighth of the zinc can and the sleeve should be placed in such a position as to leave a lip 21 extending beyond the lower edge 4 of the zinc can and a lip 22 which overlies substantially a large part of rim 6 of the zinc can. This insulating sleeve may be formed of a non-conductive rubber or synthetic elastomers such as vinyl chloride polymers, polyethylene resins and the like. The vinyl type plastics are preferred because of their cheapness.

The metal can 7 which supplies the positive terminal of the cell, and the end closure opposite to the zinc can, is as stated above, prefabricated in the form illustrated in Figures 3 and 4 of the drawings. This can is preferably formed of a steel base which may be either tin plated or nickel plated; it may be formed of copper plated steel or other metals, or alloys, of suitable strength. Referring to Figure 4 of the drawings, there is shown the conductive disc 19 being positioned within cup 7 so as to overlie the bottom interior surface thereof. Conductive disc 19 is preferably formed of a plastic such as rubber, vinyl chloride plastics or similar suitable synthetic, essentially resinous, plastic materials (which may be supported, by coating or impregnation, on a fabric or fibrous base) which in and of themselves are resistant to attack by the components of the electrolyte solution and products of decomposition formed during the cell reaction. The plastic, however, must be conductive and conductivity is preferably provided by incorporating a conductive carbonaceous material. Such materials may be graphitic or certain of the synthetic carbon blacks such as Shawinigan black. Of these carbon materials, Shawinigan black is preferred because it is somewhat easier to provide in a desired degree of fineness with the elimination of granular particles which in themselves might provide cause for leakage. Shawinigan black is also generally somewhat purer than some other forms of carbon and is free of impurities such as iron, or other metallic substances which are susceptible to attack by the zinc chloride and ammonium chloride of the electrolyte. The so-called conductive rubber may be used and for some purposes preformed carbon discs are usable. The latter, however, are not preferred because they are generally somewhat brittle and subject to breakage during the crimping which attends the final assembly of the cell.

When the zinc cup, with paper cup and mix cake in place and with the insulating sleeve 20 in place, has been completed as a subassembly and when the conductive disc 19 has been placed in the bottom of cup 7, the two metallic cups are ready for the final assembly step. Sidewalls 9 of cup 7 are slid over insulating sleeve 20 until the interior of the bottom of cup 7 and the supported conductive disc 19 rests against the bottom surface of the mix cake. The so assembled unit is then placed under compression and the annular rim of metallic cup 7 is crimped as shown at 11 in Figures 2 and 7 of the drawings. Simultaneously the upper end 10 of sidewall 9 of the metallic cup is drawn over and compressed downwardly against the upper marginal rim 6 of zinc can 1. It will be noted that the overturned lip 10 is insulated from zinc can 1 by the extension 22 of the insulating sleeve 20 and that in the drawing of lip 10 the annular rim 6 of zinc can is slightly deformed to assume the formation shown as 6a in Figure 2 and 11 in Figure 7 of the drawings. At the positive end of the cell the extension 21 of the insulating sleeve 20 is compressed and pinched both vertically and laterally. The vertical compression is between the bottom edge 4 of zinc can 1, the outer margin of disc 19, and the opposed inner surface of the annular rim of metal can 7. The lateral compression or pinching is exerted in the crimping of the lower external rim 11 of can 7 as explained above and as shown in Figures 2 and 7 of the drawings. The compression exerted between the exterior faces of cans 1 and 7 somewhat compresses and deforms the mix cake and this in turn expands the paper lining to form a snug fit against the interior of surface 2 and sidewalls 3 of the zinc can. It will be observed that the insulating tube extends beyond the end of lip 10 on the negative end of the can and extends beyond the end of paper cup 14 at the positive end of the cell as shown at 21. In the final assembly under compression, surface 8 of metal can 7 is slightly deformed and rounded but, nevertheless, presents a somewhat flattened surface which permits ready contact with another cell of a similar type. The conductive disc 19 is in assembly pressed firmly against the inner surface of bottom 8 and against the surfaces of ribs 12, the conformation of which thus serves to increase the conductive area of the conductive disc and to insure contact with the overlying mix cake.

As illustrated in Figure 8, the conformation of the annular lips 11 of the cell is such as to facilitate aligning a pair of cells, one above the other, since the lips 11 are readily accommodated in the annular depressions 6a at the negative end of the cell. An alternative form of the cell is illustrated in Figure 9 of the drawings. The final cell illustrated in Figure 2 is, as is apparent from Figure 1 of the drawings, circular in outline. It will be understood that the metallic cans may be made rectangular in outline or in fact polyangular in outline. To cooperate with metallic cups of such shape or shapes, it will be necessary to modify merely the shape of the paper cup and the conductive disc, since the remaining elements of the cell, namely, mix cake and insulating sleeve, being deformable, can readily be made to accommodate themselves to the shape of the cell cups.

When properly fabricated, conductive disc 19 being impervious to liquids provides a liquid seal for vent 13 and the compression at lip 11 effectively seals this portion of the cell against the passage of liquid. Conductive disc 19 is however gas permeable and permits excess hydrogen to be forced off through vent 13. Under normal operation, no liquid should appear at vent 13 and the presence of liquid is an indication of improper sealing within the cell. The thickness of the conductive disc should be such as to insure these results; at times, and for certain purposes, it may be desirable to employ two or a plurality of such discs.

I claim:

1. A relatively flat, dry primary cell comprising in combination an inner zinc cup comprising the negative cell terminal and at least in part the negative cell electrode, an opposed outer, substantially corrosion resistant, metal cup comprising the positive cell terminal, said cups having their sidewalls in parallelism and overlapping throughout the entire height of the sidewall of the zinc cup, an insulating elastomeric plastic sleeve disposed between all overlapping portions of said two cups, a conductive plastic sheet member comprising the positive cell electrode covering the entire interior face of said outer metal cup, the outer end of the sidewall of said outer metal cup being turned over the exterior marginal edge of said zinc cup and being insulated therefrom by said insulating plastic sleeve, the opposite end of said sidewall of said outer cup being crimped to compress an adjacent portion of said insulating sleeve, thereby to form a seal against leakage of electrolyte, and an electrolyte-wetted depolarizer mix cake within and substantially filling said cell and in electrical contact with the positive and negative cell electrodes.

2. A relatively flat, dry primary cell comprising in combination an inner zinc cup comprising the negative cell terminal and at least in part the negative cell electrode, an opposed outer, substantially corrosion resistant, metal cup comprising the positive cell terminal, said cups having their sidewalls in parallelism and overlapping throughout the entire height of the sidewall of the zinc cup, an insulating elastomeric plastic sleeve disposed between all overlapping portions of said two cups, a paper cup within and in physical contact with the inner surfaces of said zinc cup, an electrolyte-wetted depolarizer mix cake within said paper cup, a conductive plastic sheet member comprising the positive cell electrode covering the entire interior face of said outer metal cup, the outer end of the sidewall of said outer metal cup being turned over the exterior marginal edge of said zinc cup and being insulated therefrom by said insulating plastic sleeve, the opposite end of said sidewall of said outer cup being crimped to compress an adjacent portion of said insulating sleeve, thereby to form an insulated seal against leakage of electrolyte, said zinc cup having an elevated flat end face of somewhat smaller area than the total end area of the zinc cup, said depolarizer mix cake substantially filling said cells and providing electrical contact with each cell electrode.

3. A relatively flat, dry primary cell comprising in combination an inner zinc cup comprising the negative cell terminal and at least in part the negative cell electrode, an opposed outer, substantially corrosion resistant, metal cup comprising the positive cell terminal, said cups having their sidewalls in parallelism and overlapping throughout the entire height of the sidewall of the zinc cup, an insulating elastomeric plastic sleeve disposed between all overlapping portions of said two cups, a paper cup within and in physical contact with the inner surfaces of said zinc cup, an electrolyte wetted depolarizer mix cake within said paper cup, a conductive plastic sheet member comprising the positive cell electrode covering the entire interior face of said outer metal cup, said conductive plastic sheet member being permeable to hydrogen, the outer end of the sidewall of said outer metal cup being turned over the exterior marginal edge of said zinc cup and being insulated therefrom by said insulating plastic sleeve, the opposite end of said sidewall of said outer cup being crimped to compress said outer margin of said conductive sheet and to compress an adjacent portion of said insulating sleeve, thereby to form a seal against leakage of electrolyte, said outer metal cup having its end face provided with a relatively small aperture, the electrolyte within said cell providing electrical contact between the zinc cup and the other electrode.

4. A relatively flat, dry primary cell comprising in combination, an inner zinc cup comprising the negative cell terminal and at least in part the negative cell electrode, an opposed outer, substantially corrosion resistant, metal cup comprising the positive cell terminal, said cups having their sidewalls in parallelism and overlapping throughout the entire height of the sidewall of the zinc cup, an insulating elastomeric plastic sleeve disposed between all overlapping portions of said two cups, a paper cup within and in physical contact with the inner surfaces of said zinc cup, an electrolyte-wetted depolarizer mix cake within said paper cup, a hydrogen-permeable, conductive plastic sheet member comprising the positive cell electrode covering the entire interior face of said outer metal cup, the outer end of the sidewall of said outer metal cup being turned over the exterior marginal edge of said zinc cup and being insulated therefrom by said insulating plastic sleeve, the opposite end of said sidewall of said outer cup being crimped to compress said outer margin of said conductive sheet and to compress an adjacent portion of said insulating sleeve, thereby to form a seal against leakage of electrolyte, said outer metal cup having its end face provided with a gas vent, and said depolarizer mix cake substantially filling said cell.

5. The method of assembling and sealing a primary dry cell which comprises the steps of placing within a paper cup lining of a zinc cup which comprises the negative cell terminal and, at least in part, the negative cell electrode, an electrolyte-wetted depolarizer mix in an amount sufficient substantially to fill said zinc cup, placing an insulating elastomeric plastic sleeve around the outside sidewall of the zinc cup to sheathe the same, covering the interior bottom of a slightly larger second metal cup with a sheet of flexible conductive plastic material, comprising the positive cell electrode, positioning said second cup around plastic sheathed zinc cup with cup faces opposed, placing said opposed cup faces under sufficient compression to deform and to compact said wetted depolarizer mix against said conductive plastic sheet and hold the latter under compression against, and in electrically conductive contact with, the bottom interior face of said second metal cup and against the paper cup lining of said zinc cup, and while under compression, crimping the face and margin of said second metal cup around the sheathed sidewall edge of said zinc cup and drawing the sidewall edge of said second cup over the outer marginal rim of said zinc cup face.

References Cited in the file of this patent

UNITED STATES PATENTS

| Number | Name | Date |
|---|---|---|
| 2,198,423 | Anthony | Apr. 23, 1940 |
| 2,262,836 | Deibel | Nov. 18, 1941 |
| 2,463,316 | Ruben | Mar. 1, 1949 |
| 2,487,985 | Ruben | Nov. 15, 1949 |
| 2,509,249 | Rhodes | May 30, 1950 |
| 2,521,800 | Martinez et al. | Sept. 12, 1950 |
| 2,525,436 | Williams, Jr. | Oct. 10, 1950 |
| 2,601,267 | Ellis | June 24, 1952 |
| 2,617,863 | Stinson | Nov. 11, 1952 |

FOREIGN PATENTS

| Number | Country | Date |
|---|---|---|
| 561,820 | Great Britain | June 6, 1944 |